United States Patent [19]

Wilhite

[11] Patent Number: 5,737,538

[45] Date of Patent: Apr. 7, 1998

[54] SYSTEM FOR REMOTE MICROCOMPUTER ACCESS AND MODIFICATION OF INFORMATION IN HOST COMPUTER

[75] Inventor: Stephen E. Wilhite, Worthington, Ohio

[73] Assignee: CompuServe Incorporated, Columbus, Ohio

[21] Appl. No.: 627,913

[22] Filed: Apr. 2, 1996

Related U.S. Application Data

[63] Continuation of Ser. No. 97,849, Jul. 27, 1993, abandoned.

[51] Int. Cl.[6] .......................... G06F 13/14; G06F 13/42
[52] U.S. Cl. ........................ 395/200.12; 395/200.09; 395/335; 364/514 C; 364/DIG. 1
[58] Field of Search .......................... 364/DIG. 1, 514 C; 395/200.09, 156, 160, 161, 200.04, 200.17, 200.12, 200.14, 335; 379/89; 370/469

[56] References Cited

U.S. PATENT DOCUMENTS

| 4,194,242 | 3/1980 | Robbins | 364/200 |
|---|---|---|---|
| 4,270,042 | 5/1981 | Case | 235/379 |
| 4,283,771 | 8/1981 | Chang | 364/900 |
| 4,346,442 | 8/1982 | Musmanno | 364/408 |
| 4,423,313 | 12/1983 | Tanigaki | 235/379 |
| 4,423,318 | 12/1983 | Gotou | 235/379 |
| 4,429,385 | 1/1984 | Cichelli et al. | |
| 4,506,326 | 3/1985 | Shaw et al. | 364/300 |
| 4,555,775 | 11/1985 | Pike | 364/900 |
| 4,694,397 | 9/1987 | Grant et al. | 364/408 |
| 4,899,394 | 2/1990 | Lee | 382/9 |
| 5,065,347 | 11/1991 | Pajak et al. | 395/160 |
| 5,327,554 | 7/1994 | Palazzi, III et al. | |
| 5,347,632 | 9/1994 | Filepp et al. | 395/200 |
| 5,408,333 | 4/1995 | Kojima et al. | |
| 5,483,466 | 1/1996 | Kawahara et al. | 364/514 |
| 5,530,740 | 6/1996 | Iribarren et al. | 379/89 |

OTHER PUBLICATIONS

Microsoft Corp.; "Microsoft Mail Version 3.0"; Pub. # WG-26125-0692; 1992; USA; p. 1.

Compuserve; "Information Manager for Windows"; Pub. # CS-248-WI.3(Jul. 1994); 1994; USA.

Tom Lichty & Kathy Parks. "America On/line:membership Kit & Tour Guide", 1992.

*Primary Examiner*—Larry D. Donaghue
*Assistant Examiner*—Mark H. Rinehart
*Attorney, Agent, or Firm*—Standley & Gilcrest

[57] ABSTRACT

An improved system for communication between a host that keeps and updates information and a microcomputer that accesses, varies or adds to the host information. The microcomputer displays information received from the host and sends information selected or entered by the microcomputer user to the host. A multitude of applications may exist and function on the host and on the micro. A communications network may be used to carry information between the microcomputer and the host. The method provides for switching among physically separated hosts supporting different host applications.

8 Claims, 34 Drawing Sheets

FIG 1
(PRIOR ART)

1. Log onto service. (Details omitted).

2. Receive introductory remarks from service followed by prompt for a command.

. . .
   !

3. Reply by telling service where to find application:
   GO WEATHER<CR>

4. Receive subsequent response from service asking details about user's terminal:
   Select Graphics Type Choose the selection that best fits your PC's graphics capabilities
   Select instructions if you are unsure.

Type of Graphics
   1    640 x 480 x 16 colors (VGA, Macintosh II)
   2    378 x 240 x 16 colors (EGA)
   3    320 x 200 x 4 colors (CGS, Tandy 1000)
   4    320 x 200 x 2 colors (Hercules, Macintosh Plus or SE)
   5    Instructions

!

5. Reply by selecting appropriate choice:
   1<CR>

6. Service now sends "menu" of weather selections and waits for reply:
   United States (Download mode)

1    Short-Term Weather Forecasts
   2    U.S. National Weather Service Reports

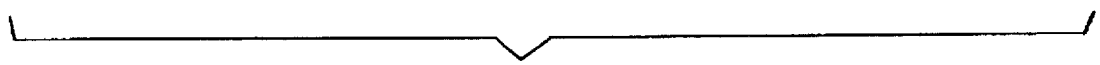

FIG 1. continued

3    Other Regions of the World
   4    Radar (for 11:36 MST 25-Mar-93)
   5    Depiction (for 11:30 MST 25-Mar-93)
   6    CompuServe Temperatures (for 11:31 MST 25-Mar-93)
   7    Satellite (for 11:00 MST 25-Mar-93)
   8    Satellite - Pacific (for 19:00 MST 24-Mar-93)
   9    Current Weather (for 10:00 MST 25-Mar-93)
   10   Tomorrow's Weather (for 10:00 MST 26-Mar-93)
   11   48-Hour Weather (for 05:00 MST 27-Mar-93)
   12   Current Temperatures (for 10:00 MST 25-Mar-93)
   13   Tonight's Lows (for 26-Mar-93)
   14   Tomorrow's Highs (for 26-Mar-93)
   15   Northeast NA (for 25-Mar-93)
   16   Southeast NA (for 25-Mar-93)

MORE!

7. User replies with selection:
   1<CR>

8. Service asks for location:

Short-Term Weather Forecasts

Enter a location or airport ID or <CR> for local:
   Current Location: TUCSON, AZ, USA

!

9. User responds with a <CR>:
   <CR>

10. Service finally retrieves specific weather report, formats it, and sends it to user:

FQUS1 KTUS 251746
    AZZ009-252245-

FIG. 1 continued

GREATER TUCSON AREA FORECAST
NATIONAL WEATHER SERVICE TUCSON AZ
945 AM MST THU MAR 25 1993

. TODAY ... MOSTLY SUNNY WITH CONSIDERABLE
HIGH CLOUDINESS. HIGH IN THE LOWER 80S.
SOUTHEAST WIND 10 TO 15 MPH. . TONIGHT...
INCREASING CLOUDS WITH A SLIGHT CHANCE OF
SHOWERS BY MORNING. BREEZY AT TIMES. LOW IN
THE MID 50S. SOUTHEAST WIND 5 TO 15 MPH. CHANCE
OF RAIN 20 PERCENT. . FRIDAY... CLOUDY WITH RAIN
LIKELY... POSSIBLY THUNDERSTORMS. BREEZY AND
MUCH COOLER. HIGH IN THE LOWER 70S. CHANCE
OF RAIN 60 PERCENT.

CRIMMINS

!

11. (User may Logoff at this point).

FIG. 2
(HMI ACCESS TO WEATHER)

1. User selects Weather by "clicking" (pointing the display arrow and pressing a button) on the weather in the application's display. (User is not even logged onto information system at this point.)

The application program now displays menu of "Local", "City" or "Station Codes" for user to choose from. If the default (local) is acceptable, the user "clicks" on "OK" to proceed.

2. At this point, the application determines it has to log onto the service and start HMI. It does so (details omitted).

3. Now the host enters Display Application Protocol and requests the micro to do the same by sending the following PDU:

```
   invoke_protocol_request =
     RECORD
       prev_CAP: BYTE = 00;
       prev_PTI: BYTE = 00;
       cap_id: BYTE = 01;        ! CAP identifier
       CASE cap_id OF
         WHEN 0 =>
           exit_cmd: STRING;     ! the textual command that
                                 ! will cause a RESUME
         WHEN 1 =>
           page_name: STRING = NULL;
                                 ! the page name that caused
                                 ! protocol invoke to occur.
         WHEN OTHERS =>
           NULL;
         END;
     END;
   ```

4. The micro application responds with the following PDU:

```
   invoke_protocol_response =
     RECORD
   ```

FIG. 2 continued

```
        prev_CAP: BYTE = 00;
        prev_PTI: BYTE = 00;
        version: BYTE = 01;        ! CAP version number
        If cap_id = 0 THEN         ! INVOKE-PROTOCOL CAP id
            lines: BYTE;           ! number of terminal lines
            columns: BYTE;         ! number of TTY columns
        END IF;
    END;
```

5. Next the application requests the weather by sending the information host a "weather request" PDU that consists of the following:

```
        weather_request =
          RECORD
            curr_cap: BYTE = 01;
            curr_PTI: BYTE = 00;
            type: BYTE = 1;            ! "location"
            CASE type OF
                WHEN 0 =>              ! not specified
                    NULL;
                WHEN 1 =>              ! "location"
                  city: STRING = "TUCSON"
                  state: STRING = "AZ"
                  country: STRING = "USA"

WHEN 2 =>
                  station: STRING;
            END CASE;
        END;
```

6. The host responds with a DATA response packet containing the weather:

```
        data_response =
          RECORD
            curr_cap: BYTE = 01;
            curr_PTI: BYTE = 00;
            request_pti: BYTE;
```

FIG. 2 continued data: "GREATER TUCSON AREA FORECAST
NATIONAL WEATHER SERVICE TUCSON AZ
945 AM MST THU MAR 25 1993

.TODAY ... MOSTLY SUNNY WITH CONSIDERABLE
HIGH CLOUDINESS. HIGH IN THE LOWER 80S.
SOUTHEAST WIND 10 TO 15 MPH. . TONIGHT...
INCREASING CLOUDS WITH A SLIGHT CHANCE OF
SHOWERS BY MORNING. BREEZY AT TIMES. LOW IN
THE MID 50S. SOUTHEAST WIND 5 TO 15 MPH. CHANCE
OF RAIN 20 PERCENT. . FRIDAY... CLOUDY WITH RAIN
LIKELY... POSSIBLY THUNDERSTORMS. BREEZY AND
MUCH COOLER. HIGH IN THE LOWER 70S. CHANCE
OF RAIN 60 PERCENT.

CRIMMINS";
END;

7. The application running in the micro receives this response and displays it as appropriate. It may choose to only display a portion of it in a small "window" and let the users scroll through it to view all of it.

8. (The user may log off at this point.)

FIG. 3
(HMI STARTUP, ACCESS, CHANGE APP, RETURN)

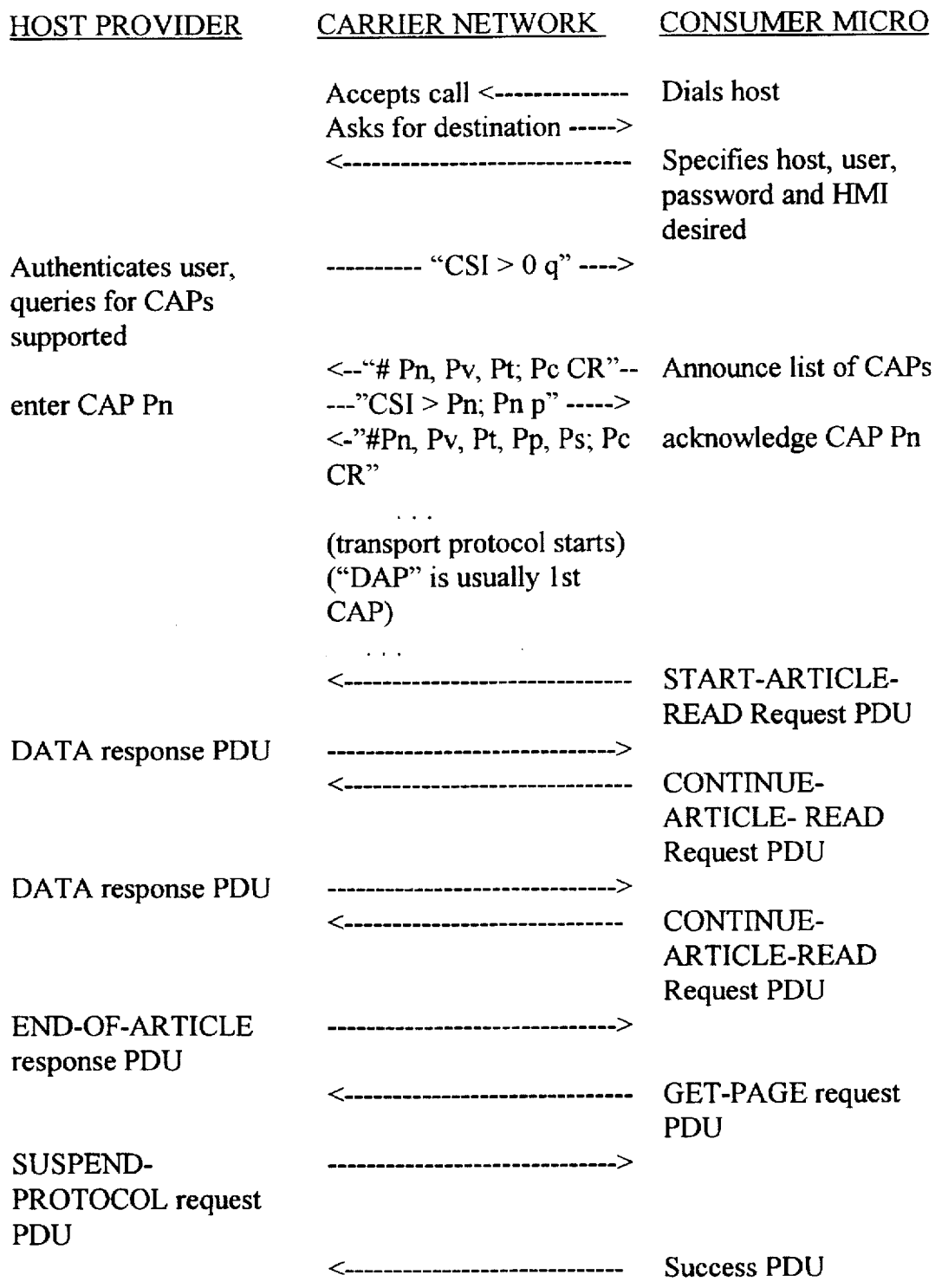

| HOST PROVIDER | CARRIER NETWORK | CONSUMER MICRO |
|---|---|---|
| | Accepts call <-------------- <br> Asks for destination -----> <br> <------------------------------ | Dials host <br><br> Specifies host, user, password and HMI desired |
| Authenticates user, queries for CAPs supported <br><br> enter CAP Pn | ---------- "CSI > 0 q" ----> <br><br><br><br> <--"# Pn, Pv, Pt; Pc CR"-- <br> ---"CSI > Pn; Pn p" -----> <br> <-"#Pn, Pv, Pt, Pp, Ps; Pc CR" <br><br> . . . <br> (transport protocol starts) ("DAP" is usually 1st CAP) <br> . . . | <br><br><br><br> Announce list of CAPs <br><br> acknowledge CAP Pn |
| | <------------------------------ | START-ARTICLE-READ Request PDU |
| DATA response PDU | ------------------------------> <br> <------------------------------ | CONTINUE-ARTICLE- READ Request PDU |
| DATA response PDU | ------------------------------> <br> <------------------------------ | CONTINUE-ARTICLE-READ Request PDU |
| END-OF-ARTICLE response PDU | ------------------------------> <br> <------------------------------ | <br> GET-PAGE request PDU |
| SUSPEND-PROTOCOL request PDU | ------------------------------> <br><br> <------------------------------ | <br><br> Success PDU |

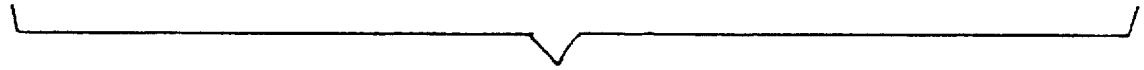

(HMI RETRIEVE, TTY EMULATE, RESUME)

FIG. 5
(ENS CONFIGURATION RESPONSE)

```
configuration_response =
 RECORD
   alerts:                                ! 1 byte
    RECORD
      unauthorized: BIT 0;                ! not allowed to read stories
      new_bulletin: BIT 1;
    END;

CASE alerts.unauthorized OF
     WHEN 0 =>                            ! Allowed to read
      user_folders: BYTE;
      public_folders: BYTE;
      wire_updated: TimeStamp4;
                                          ! last time wires were changed
      max_user_folders: BYTE;             ! max # of folders allowed
      retention_limit: BYTE;              ! max # of days to keep a story
      expiration_limit: BYTE;             ! max # of months to keep a folder
      max_criteria: BYTE;                 ! max # of search criteria
      max_criteria_len: BYTE;             ! max length of a search criteria
      max_name_len: BYTE;                 ! max length of a folder name
      current_date: Date;
     WHEN 1 =>                            ! Not allowed to read
      agreement: STRING:                  ! text object
   END CASE;

product_name: STRING;                  ! unique service name for the product
   product_title: STRING;
 END;
```

FIG. 6
(ENS OVERVIEW REQUEST)

```
get_folder_overview_request =
 RECORD
   type: FolderTypes:            ! Public = 0
                                 ! User = 1
 END;
```

FIG. 7
(ENS OVERVIEW RESPONSE)

```
folder_overview_response =
 RECORD
  num_folders: BYTE;

overview: ARRAY [1 .. num_folders] OF
   RECORD
     id: FolderID;
     name: STRING;
     total_stories: WORD;        ! - 1 if total story count
                                 ! is unknown
     capabilities:               ! 2 bytes
      RECORD
        all_searchable: BIT 0;
        wire_searchable: BIT 1;
        date_searchable: BIT 2;
        ticker_searchable: BIT 3;
        key_headline_searchable: BIT 4;
        key_lead_searchable: BIT 5;
        key_fulltext_searchable: BIT 6;
        reserved: BIT 7 .. 15;
      END;

alerts:                     ! 1 byte
      RECORD
        folder_full: BIT 0;
```

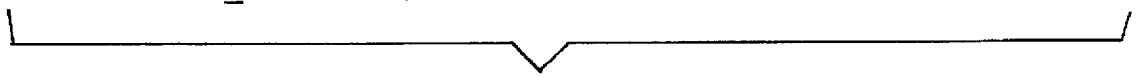

FIG. 7 continued

```
      folder_expired: BIT 1;
      expiration_pending: BIT 2;
      no_provider_list: BIT 3;
      reserved_2: BIT 4 . . 7;
    END;

IF alerts.no_provider_list = 0 THEN
      num_wires: BYTE;           ! subset of wire-info
      wire: ARRAY [1 . . num_wires] OF WireID;
    END IF;
  END;
END;
```

FIG. 8
(ENS SEARCH REQUEST)

```
start_folder_search_request =
    RECORD
        id: FolderID;
        count: BYTE:
        start_story: StoryNo;              ! 0 = Search all stories
        components: StoryComponents;
        num_terms: BYTE;

search: ARRAY [1 .. num_terms] OF
            RECORD
                type: SearchTypes:         ! All = 0
                                           ! Wire = 1
                                           ! DataRange = 2,
                                           ! Ticker = 3,
                                           ! Keyword_Headline = 4,
                                           ! Keyword_Lead = 5,
                                           ! Keyword_Fulltext = 6
                CASE type OF
                    WHEN Wire =>
                        search_wire: WireID;
                    WHEN DateRange =>
                        search_startdate: DATE;
                        search_enddate: DATE;
                    WHEN Ticker =>
                        search_ticker: STRING;
                    WHEN Keyword_Headline =>
                        search_keyword: STRING;
                    WHEN Keyword_Lead =>
                        search_keyword: STRING;
                    WHEN Keyword_Fulltext =>
                        search_keyword: STRING;
                END CASE;
            END;
    END;
```

FIG. 9
(ENS SEARCH RESPONSE)

```
folder_search_response =
    RECORD
        count: BYTE;
        components: StoryComponents;
        total_stories: WORD;    ! -1 if total story count is unknown
        summary: ARRAY [1 .. count] OF
            RECORD
                story: StoryNo;
                date: TimeStamp4  IF WantDate IN components;
                wire: WireID IF WantWire IN components;
                title: STRING IF WantTitle IN components;
                size: DWORD IF WantSize IN components;
                lead: STRING IF WantLead IN components;
            END;
    END;
```

FIG. 10
(ENS CONTINUE SEARCH)

```
continue_folder_search_request =
    RECORD
        count: BYTE;
    END;
```

FIG. 11
(ENS START READ REQUEST)

```
start_story_read_request =
    RECORD
        story: StoryNo;
        start_pos: DWORD;        !starting character position
        length: WORD;
    END;
```

FIG. 12
(DATA RESPONSE)

```
data_response =
    RECORD
        request_pti: BYTE;           ! Identifies who requested the data
        data: "rest of the packet";  ! Part of news story
    END;
```

FIG. 13
(ENS CONTINUE STORY REQUEST)

```
continue_story_read_request =
    RECORD
        length: WORD;
    END;
```

FIG. 14
(ENS DELETE STORY REQUEST)

```
delete_story_request =
    RECORD
        folder: FolderID;
        count: Xcount;
        story: ARRAY [1 .. count] OF StoryNo;
    END;
```

FIG. 15
(EMP CONFIG REQUEST)

```
read_config_request =
    RECORD
            mailbox_name: STRING;      ! may be null
            password: STRING;          ! may be null
            option: WORD;              ! bit 0 = can receive multiple-
                                       !   part messages
    END;
```

FIG. 16
(EMP CONFIG RESPONSE)

```
config_response =

RECORD
  current_time: TimeStamp8;
  old_msgs: WORD;
  new_msgs: WORD;
  priority_msgs: WORD;
  returned_msgs: WORD;
  undelivered_msgs: WORD;
    options:                           ! 2 bytes
      RECORD
        auto_delete: BIT 0;            ! 1 = read messages are deleted at
                                       ! the end of the session reserved: BIT 1 .. 15;
      END;
    restrictions:                      ! 2 bytes
      RECORD
        cant_send: BIT 0;              ! 1 = SEND-MSG-HEADER &
                                       ! SEND-MSG-CONTENTS requests
                                       ! not allowed for this session only_one_content: BIT 1;
        cant_delay_delete: BIT 2;
```

FIG. 16 continued

```
                                        ! 1 = messages can't be delay deleted
                                        ! during this session
    no_forward_msg: BIT 3;              ! 1 = forward_msg option in
                                        ! SEND-MSG-HEADER request not
                                        ! allowed.
    no_surcharges_on_send:BIT 4;
                                        ! 1 = surcharge field in SEND-MSG-
                                        ! HEADER request must be zero.
    reserved: BIT 5 .. 15;
  END;
  currency_type: Currency;
  max_recipients: Xcount;
END;
```

FIG. 17
(EMP MSG REQUEST)

```
search_msg_req : :=
RECORD
    count:   BYTE;
    start_msg: MsgNo;
    componen : BYTE;     ! message summary components to be
                         ! returned
                                    ! bit 0 = message id
                                    ! bit 1 = date
                                    ! bit 2 = total size of message
                                    ! bit 3 = recipient options
                                    ! bit 4 = message surcharge
    num_term  BYTE;
    search:  ARRAY [1 .. num_terms] OF
        RECORD
            type: SearchTypes;
            pattern: STRING;
        END;
END;
```

FIG. 18
(EMP MESSAGE SUMMARY RESPONSE)

```
msg_summary_response =
RECORD
    components BYTE;          ! bit 0 = message id
                              ! bit 1 = date
                              ! bit 2 = total size of message
                              ! bit 3 = recipient options
                              ! bit 4 = message surcharge
    count: BYTE;
    summary: ARRAY [1 .. count] OF
        RECORD
            msg_no: MsgNo;
            subject: STRING;
```

FIG. 18 continued

```
        originator_name: STRING;
        msg_id: MsgID IF components [0] = 1;
        date: TimeStampe4 IF components [1] = 1;
        total_size: DWORD IF components [2] = 1;
        options: RecipientOptions IF components [3] = 1;
        surcharge: DWORD IF components [4] = 1;

! total message surcharge in
                                    ! specified currency units
            END;
END;
```

FIG. 19
(EMP MESSAGE HEADER REQUEST)

```
read_msg_header_request =
  RECORD
      msg_no: MsgNo;
      components: WORD:    ! message header components to be returned
                           ! bit 0 = message id
                           ! bit 1 = date
                           ! bit 2 = originator address
                           ! bit 3 = recipient options
                           ! bit 4 = list of primary recipients
                           ! bit 5 = list of copy recipients
                           ! bit 6 = in reply to message id
                           ! bit 7 = table of contents
                           ! bit 8 = extended envelopes
                           ! bit 9 = expiration time
                           ! bit 10 - 15 reserved
  END;
```

FIG. 20
(EMP MESSAGE HEADER RESPONSE)

```
msg_header_response =
  RECORD
      components: WORD;    ! bit 0 = message id
                           ! bit 1 = date
                           ! bit 2 = originator address
                           ! bit 3 = recipient options
                           ! bit 4 = list of primary recipients
                           ! bit 5 = list of copy recipients
                           ! bit 6 = in reply to message id
                           ! bit 7 = table of contents
                           ! bit 8 = extended envelopes
                           ! bit 9 = expiration time
                           ! bit 10 - 15  reserved
      msg_id: MsgID IF components [0] = 1;
      date: TimeStamp4 IF components [1] = 1;
      originator_address: STRING IF components [2] = 1;
      options: RecipientOptions IF components [3] = 1;

IF components [8] = 1 THEN
             total_primary_recipients: WORD IF components [4] = 1;
             total_copy_recipients: WORD IF components [5] = 1;
      END IF;

IF components [4] = 1 THEN
             primary_recipients: BYTE;
             primary_recipeint: ARRAY [1 .. primary-recipients] OF
                RECORD
                    primary_name: STRING;
                    primary_address: STRING;
                END;
      END IF;

IF components [5] = 1 THEN
             copy_recipients: BYTE;
             copy_recipients: ARRAY [1 .. copy_recipients] OF
```

FIG. 20 continued

```
        RECORD
              copy_name: STRING;
              copy_address: STRING;
        END;
  END IF;

in_reply_to: MsgID IF components [6} = 1;
  expiration_time: TimeStamp4 IF components [9] = 1;

IF components [7] = 1 THEN
        num_contents: BYTE;
        contents: ARRAY [1 .. num_contents] OF
          RECORD
              contents_no: BYTE;
              size: DWORD;
              contents_subject: STRING;
              contents_name: STRING;
              type_of_contents: ContentTypes;  ! 0  text message
                                               ! 1  8-bit binary data
                                               ! 2  GIF graphics
                                               ! 3  8-bit binary file
                                               ! 4  text file
                                               ! 5  TextObject message
                                               ! 6  JPEG graphic data surcharge: DWORD;   ! surcharge in currency units
          END;
  END IF;

END;
```

FIG. 21
(EMP READ MESSAGE CONTENTS REQUEST)

```
read_msg_contents_request =
    RECORD
        msg_no: MsgNo;
        contents_no: BYTE;
        start_pos: COUNT24;   ! starting character position
        length: WORD;         ! maximum number of characters to
                              ! return
    END;
```

FIG. 22
(EMP RECEIVE MESSAGE CONTENTS REQUEST)

```
read_msg_contents_request =
    RECORD
        msg_no: MsgNo;
        contents_no: BYTE;
        start_pos: COUNT24;   ! starting character position
        length: WORD;         ! maximum number of characters to
                              ! return
    END;
```

FIG. 23
(DATA RESPONSE)

```
data_response =
    RECORD
        request_pti: BYTE;           ! Identifies who requested the data
        data: "rest of the packet";  ! Part of message text
    END;
```

FIG. 24
(FAP CONFIG RESPONSE)

```
config_response =
 RECORD
  msg_no_base: COUNT24;
  last_access: TimeStamp4;
  last_msg_read: WORD;
  newest_msg: WORD;
  alerts:                      ! 2 bytes
   RECORD
    waiting_msgs: BIT 0;       ! new messages addressed to the user
    new_bulletin: BIT 1;       ! new short bulletin
    conference: BIT 2;         ! conference in progress
    not_member: BIT 3;         ! user is not a member
    is_sysop: BIT 4
    free_user: BIT 5
    reserved: BIT 6 .. 15;     ! must be zero
   END;
  restrictions:                ! 2 bytes
   RECORD
    no_message_read: BIT 0;
    no_message_send: BIT 1;
    no_library_read: BIT 2;
    no_library_send: BIT 3;
    no_conference: BIT 4;
    no_private_msgs: BIT 5;
    no_EasyPlex: BIT 6;
    no_membership: BIT 7;
    closed_forum: BIT 8
    reserved: BIT 9 .. 15;     ! must be zero
   END;
  forum_name: STRING;
  user_id: UserID;
  user_name: STRING;
  max_msg_size: WORD;          ! maximum size, in bytes, of message body
  forum_id: STRING;
  last_updated: Date;
  msg_sections: BIT 0 .. 23;
  lib_sections: BIT 0 .. 23;
 END;
```

FIG. 25
(FAP GET MESSAGE COUNTS REQUEST)

```
get_msg_counts_request =
    RECORD
        msg_sections: BIT 0 .. 23;    ! bit vector of message sections
        msg_no: WORD;
    END;
```

FIG. 26
(FAP GET MESSAGE COUNTS RESPONSE)

```
msg_counts_response =
    RECORD
        count: BYTE;
        summary: ARRAY [1 .. count] OF
            RECORD
                msg_section_no: BYTE;
                new_msgs: XCOUNT;
                new_threads: XCOUNT;
            END;
    END;
```

FIG. 27
(FAP SECTIONS RESPONSE)

```
msg_sections_response =
 RECORD
    num_sections: BYTE;
    section: ARRAY [1 .. num_sections] OF
      RECORD
        section_id:                          ! 1 byte
          RECORD
             msg_section_no: BIT 0 .. 4;     ! used as reference
             reserved: BIT 5 .. 6;           ! must be zero
             selected: BIT 7;
          END;
        section_title: STRING;               ! [19]
      END;
 END;
```

FIG. 28
(FAP START MESSAGE SEARCH REQUEST)

```
start_msg_search_request =
 RECORD
   context: BYTE;
   count: BYTE;
   msg_sections: BIT 0 . . 23;    ! bit vector of message sections
   start_msg: WORD;
   components: BYTE;              ! message components to be returned;
                                  ! bit 0 = subject text
                                  ! bit 1 = originator name
                                  ! bit 2 = recipient name
                                  ! bit 3 = number of new messages
                                  ! bit 4 = total number of messages
                                  ! bit 5 = message section number
                                  ! bit 6 = thread id
                                  ! bit 7 = pseudo roots
   num_terms: BYTE;               ! must be 1 in version 0
   search: ARRAY [1 . .
   num_terms] OF
    RECORD
     type: BYTE;                  ! 0 = all messages
                                  ! 1 = waiting messages
                                  ! 2 = subject text
                                  ! 3 = originator name
                                  ! 4 = recipient name
     pattern: STRING;             ! ignored when type = 0 or type = 1
    END;
 END;
```

FIG. 29
(FAP MSG SUMMARY RESPONSE)

```
msg_summary_response =
 RECORD
   components: BYTE;          ! bit 0 = subject text
                              ! bit 1 = originator name
                              ! bit 2 = recipient name
                              ! bit 3 = number of new messages
                              ! bit 4 = total number of messages
                              ! bit 5 = message section number
                              ! bit 6 = thread id
                              ! bit 7 = pseudo roots
   count: BYTE;
   summary: ARRAY [1 .. count] OF
       RECORD
           subject_text: STRING IF components [0] = 1;
           originator_name: STRING IF components [1] = 1;
           recipient_name: STRING IF components [2] = 1;
           new_msgs: XCOUNT IF components [3] = 1;
           total_msgs: XCOUNT IF components [4] = 1;
           msg_section_no: BYTE IF components [5] = 1;
           thread_id: DWORD IF components [6] = 1;
           CASE components [7] OF    ! pseudo roots flag
             WHEN 0 =>
                 owner: BYTE;         ! 1 = message was sent by this user
                 msg_no: WORD;
             WHEN 1 =>
                 num_msgs: XCOUNT;
                 msg_no: ARRAY [1 .. num_msgs] OF WORD;
                                      ! list of pseudo roots
           END CASE;
       END;
 END;
```

FIG. 30
(FAP READ MESSAGE HEADER REQUEST)

```
read_msg_header_request =
 RECORD
   msg_no: WORD;
   components: WORD;      ! message header components to be returned
                          ! bit 0 = msg_no
                          ! bit 1 = parent_msg
                          ! bit 2 = next_sibling
                          ! bit 3 = first_child
                          ! bit 4 = num_children
                          ! bit 5 = msg_section_no
                          ! bit 6 = date
                          ! bit 7 = subject_text
                          ! bit 8 = originator_name
                          ! bit 9 = originator_id
                          ! bit 10 = recipient_name
                          ! bit 11 = recipient_id
                          ! bit 12 = thread_id
                          ! bit 13 = msg size
 END;
```

FIG. 31
(FAP READ MESSAGE HEADER RESPONSE)

read_msg_header_response =
RECORD
  components: WORD;    ! bit 0 = msg_no
                                        ! bit 1 = parent_msg
                                        ! bit 2 = next_sibling
                                        ! bit 3 = first_child
                                        ! bit 4 = num_children
                                        ! bit 5 = msg_section_no
                                        ! bit 6 = date
                                        ! bit 7 = subject_text
                                        ! bit 8 = originator_name
                                        ! bit 9 = originator_id
                                        ! bit 10 = recipient_name
                                        ! bit 11 = recipient_id
                                        ! bit 12 = thread_id
                                        ! bit 13 = msg size
                                        ! bit 14 = message doesn't exist (only in a response to a READ-MSGS request
                                        ! bit 15 = all new messages in the thread (only in a response to a READ-MSGS request
  msg_no: WORD IF components [0] = 1;
  parent_msg: WORD IF components [1] = 1;
  next_sibling: WORD IF components [2] = 1;
  first_child: WORD IF components [3] = 1;
  num_children: XCOUNT IF components [4] = 1;
  msg_section_no: BYTE IF components [5] = 1;
  date; TimeStamp4 IF components [6] = 1;
  subject_text: STRING IF components [7] = 1;
  originator_name: STRING IF components [8] = 1;
  originator_id: UserID IF components [9] = 1;
  recipient_name: STRING IF components [10] = 1;
  recipient_id: UserID IF components [11] = 1;
  thread_id: DWORD IF components [12] = 1;
  msg_size: WORD IF components [13] = 1;

FIG. 31 continued

```
flags:                              ! 1 byte
  RECORD
        deletable: BIT 0;           ! 1 = message can be deleted
        owner: BIT 1;               ! 1 = message was sent by user
        private_msg: BIT 2;         ! 1 = message body is private
        read_by_recipient: BIT 3;
        reserve: BIT 4 .. 7;        ! must be zero
  END;
END;
```

FIG. 32
(FAP START MESSAGE BODY READ REQUEST)

```
start_msg_body_read_request =
    RECORD
        msg_no:    WORD;
        start_pos: WORD;    ! starting character position
        length:    WORD;    ! maximum number of characters
                            ! to return
    END;
```

FIG. 33
(FAP CONTINUE MESSAGE BODY READ REQUEST)

```
continue_msg_body_read_request =
    RECORD
        length: WORD;       ! maximum number of characters
    END;
```

FIG. 34
(DATA RESPONSE)

```
data_response =
    RECORD
        request_pti: BYTE            ! Identifies who requested the data
        data: "part of message":     ! Part of message text
    END;
```

FIG. 35
(FAP READ MAP REQUEST)

```
read_map_request =
  RECORD
    msg_no: WORD;              ! message to begin map response with
    options: BYTE;             ! request options:
                               ! bit 0 = send pseudo reoots
    components: WORD;          ! message components to send
                               ! bit 0 = msg_no
                               ! bit 1 = parent_msg
                               ! bit 2 = next_sibling
                               ! bit 3 = first_child
                               ! bit 4 = num_children
                               ! bit 5 = n/a
                               ! bit 6 = date_time_sent
                               ! bit 7 = n/a
                               ! bit 8 = originator_name
                               ! bit 9 = originator_id
                               ! bit 10 = recipient_name
                               ! bit 11 = recipient_id
                               ! bit 12 = n/a
                               ! bit 13 = msg size
    depth: XCOUNT;             ! 0 implies all, otherwise,
                               ! the map information is sent
                               ! only for messages up to depth
    frame_size: WORD;          ! total number of bytes per frame
  END;
```

FIG. 36
(FAP MAP RESPONSE)

```
message_map_response =
RECORD
    components: WORD;        ! message components to send
                             ! bit 0 = msg_no
                             ! bit 1 = parent_msg
                             ! bit 2 = next_sibling
                             ! bit 3 = first_child
                             ! bit 4 = num_children
                             ! bit 5 = n/a
                             ! bit 6 = date_time_sent
                             ! bit 7 = n/a
                             ! bit 8 = originator_name
                             ! bit 9 = originator_id
                             ! bit 10 = recipient_name
                             ! bit 11 = recipient_id
                             ! bit 12 = n/a
                             ! bit 13 = msg size
    total_msgs: XCOUNT;      ! count of messages across all frames
                             ! that satisfy the request
    token_count: XCOUNT;
    tokens: ARRAY [1 .. token_count] OF STRING;
                             ! string value for token in this position
    msg_count: XCOUNT;
    msgs: ARRAY [1 .. msg_count} OF
        RECORD
            msg_no: WORD IF components [0] = 1;
            parent_msg: WORD IF components [1] = 1;
            next_sibling: WORD IF components [2] = 1;
            first_child: WORD IF components [3] = 1;
            num_children: WORD IF components [4] = 1;
            date: TimeStamp4 IF components [6] = 1;
            originator_name: XCOUNT IF components [8] = 1;
            originator_id: XCOUNT IF components [9] = 1;
            recipient_name: XCOUNT IF components [10] = 1;
            recipient_id: XCOUNT IF components [11] = 1;
            msg_size: WORD IF components [13] = 1;
```

FIG. 36 continued

```
        flags:                  ! 1 byte
            RECORD
                deletable: BIT 0;        ! 1 = message can be deleted
                owner: BIT 1;            ! 1 = message was sent by user
                private_msg: BIT 2;      ! 1 = message body is private
                read_by_recipient: BIT 3;
                reserved: BIT 4 .. 7;    ! must be zero
            END;
    END;
END;
```

SYSTEM FOR REMOTE MICROCOMPUTER ACCESS AND MODIFICATION OF INFORMATION IN HOST COMPUTER

This application is a file wrapper continuation of application Ser. No. 08/097,849 filed Jul. 27, 1993, now abandoned.

BACKGROUND AND SUMMARY OF THE INVENTION the present invention relates to a method of communication between an information or service provider and an information consumer. The communication consists primarily of requests for "Information Service Objects", "Information Service Objects" themselves, and information necessary for efficient control of such communications. This interface between a Host, having the role of a service provider, and a Microcomputer, having a role of a remote information consumer, may be called "Host Micro Interface" or HMI protocol.

A communications network may be used to provide a medium for information transfer between any particular information consumer and all the information providers he may access. The present invention, HMI uses the facilities of this communications network to transfer "information service objects" and associated information between these parties.

Historically, information providers were responsible for preparing the information specifically for each user's display. They sent questions to the consumer, interpreted his responses, and replied with appropriate information as the dialogue proceeded. Information was sent as text streams to be displayed as it was received. These streams often contained a mixture of displayable characters and display modifying instructions.

With HMI, the information provider system sends "protocol data units"(PDUs) to the information consumer's computer. The information consumer's computer application determines what information to display and what information to store for later use; it also decides how to display the information. Questions may be presented to the user by the computer application in the information consumer's computer; they are derived from lists of options sent in PDUs from the service provider(s). Responses, usually selections, are converted into information requesting PDUs and sent to the provider as such.

Known systems have utilized PDU encapsulation of user specific data. U.S. Pat. No. 4,694,397, is specific to exchanges between computers of a banking system and a brokerage system, and U.S. Pat. No. 4,506,326, is specific to exchanges between computers responsible for maintaining a database management system and computers responsible for making inquiries of that system and displaying data responses returned from the database management system. The present invention is distinguishable from these systems in that it defines a multitude of application protocols for an ever extensible information system.

Protocols have been defined and implemented to provide reliable and error free exchange of PDUs. These include: XMODEM, Kermet, B Protocol, X.25 and X.21. HMI is distinguishable from these in that it is an interface which, though it may use these protocols for the purpose they serve, addresses application functions and not Network, Data-link and Physical layers. The ARPANET (Advanced Research Projects Agency NETwork) is an example of a network that supports these lower protocol layers. HMI is unique in that it provides an integrated method to switch among applications and PDU functions without user interaction.

There are two main purposes that HMI achieves: (1) provides an efficient connection between an end-user and remote-host(s) such that the user need not be aware of the actual supporting mechanisms and (2) provides an efficient means of conveying requests for information, information flow progress and information response components. The remote-hosts need not prepare the information for presentation on specific displays. Thus they are freed of the associated overhead. Presentation (that is: display) details are not sent in HMI; display considerations are the sole responsibility of the end-user's application and how the end-user sets it up.

An underlying Transport protocol may be utilized to provide an error free, object length independent connection. This may utilize various protocols to effect communication between hosts and micros.

Unlike conventional Session, Application and Presentation protocols, HMI protocol uses different PDUs depending upon the direction and purpose of information being requested or provided. Also, depending upon the capabilities of the remote-host, even the underlying Link and Transport protocols may be switched on and off according to instructions from packets in HMI.

Each application may have its own set of PDUs, called a "CompuServe Application Protocol"(CAP), named after the assignee corporation of the present invention. Every PDU, used in HMI, preferably has a CAP ID number and a "Packet Type Identifier"(PTI) number. Every CAP preferably supports and makes use of certain "Common CAP PTIs" for frequently used requests and responses.

Common CAP PTIs include: SUCCESS Response, FAILURE Response, TERMINATE Request, DATA Response, CANCEL Request, SHUTDOWN Request, DISCONNECT Request, EXIT Request, INVOKE-PROTOCOL Request, INVOKE-PROTOCOL Response, RESUME-PROTOCOL Request, SUSPEND-PROTOCOL Request, QUOTES-DATA Request, QUOTES-DATA Response, RESYNC Request, WAIT Response, TEST Request, WEATHER Request, ALERT Request, PROMPT Response and PROMPT Request.

Within each CAP a large number of specific purpose PTIs may exist. These may be stock quote based for financial CAPs or article based for display CAPs. The user would not be aware of switching communication links and/or protocols that may occur between the remote hosts and the user's microcomputer. In this regard HMI is transparent or hidden to the user.

BRIEF DESCRIPTION OF THE DRAWINGS

FIG. 1 is a depiction of a non-HMI access to a weather information service;

FIG. 2 is a depiction of HMI access to a weather information service;

FIG. 5 shows the contents of an ENS configuration response PDU of the present invention;

FIG. 6 shows the contents of an ENS overview request PDU of the present invention;

FIG. 7 shows the contents of an ENS overview response PDU of the present invention;

FIG. 8 shows the contents of an ENS search request PDU of the present invention;

FIG. 9 shows the contents of an ENS search response PDU of the present invention;

FIG. 10 shows the contents of an ENS continue search request PDU of the present invention;

FIG. 11 shows the contents of an ENS start read request PDU of the present invention;

FIG. 12 shows the contents a of data response PDU within the ENS CAP of the present invention;

FIG. 13 shows the contents of an ENS continue story request PDU of the present invention;

FIG. 14 shows the contents of an ENS delete story request PDU of the present invention;

FIG. 15 shows the contents of an EMP configuration request PDU of the present invention;

FIG. 16 shows the contents of an EMP configuration response PDU of the present invention;

FIG. 17 shows the contents of an EMP message request PDU of the present invention;

FIG. 18 shows the contents of an EMP message summary response PDU of the present invention;

FIG. 19 shows the contents of an EMP message header request PDU of the present invention;

FIG. 20 shows the contents of an EMP message header response PDU of the present invention;

FIG. 21 shows the contents of an EMP read message contents request PDU of the present invention;

FIG. 22 shows the contents of an EMP receive message contents request PDU of the present invention;

FIG. 23 shows the contents of a data response PDU within the EMP CAP of the present invention;

FIG. 24 shows the contents of a FAP configuration response PDU of the present invention;

FIG. 25 shows the contents of a FAP get message counts request PDU of the present invention;

FIG. 26 shows the contents of a FAP message counts response PDU of the present invention;

FIG. 27 shows the contents of a FAP sections response PDU of the present invention;

FIG. 28 shows the contents of a FAP start message search request PDU of the present invention;

FIG. 29 shows the contents of a FAP message summary response PDU of the present invention;

FIG. 30 shows the contents of a FAP read message header request PDU of the present invention;

FIG. 31 shows the contents of a FAP message header response PDU of the present invention;

FIG. 32 shows the contents of a FAP start message body read request PDU of the present invention;

FIG. 33 shows the contents of a FAP continue message body read request PDU of the present invention;

FIG. 34 shows the contents of a data response PDU within the FAP CAP of the present invention;

FIG. 35 shows the contents of a FAP read map request PDU of the present invention; and FIG. 36 shows the contents of a FAP map response PDU of the present invention.

DETAILED DESCRIPTION OF PREFERRED EMBODIMENT(S)

Without HMI, the procedure for a user to receive a local weather report may consist of the steps shown in FIG. 1. With HMI, both the user involvement and the amount of information passed between the user's micro and the information providing system are reduced. To view the same weather report with HMI, the steps illustrated in FIG. 2 take place.

From these examples, it is apparent that with the present invention the host, the communications network and the user all have significantly less to do to select and view data. Much of this can be credited to the intelligent application running on the micro. This "Information Manager" is responsible for maintaining communications with the host, for keeping track of data it has received from the host, displaying appropriate data and, providing selections to the user.

Figure 3:
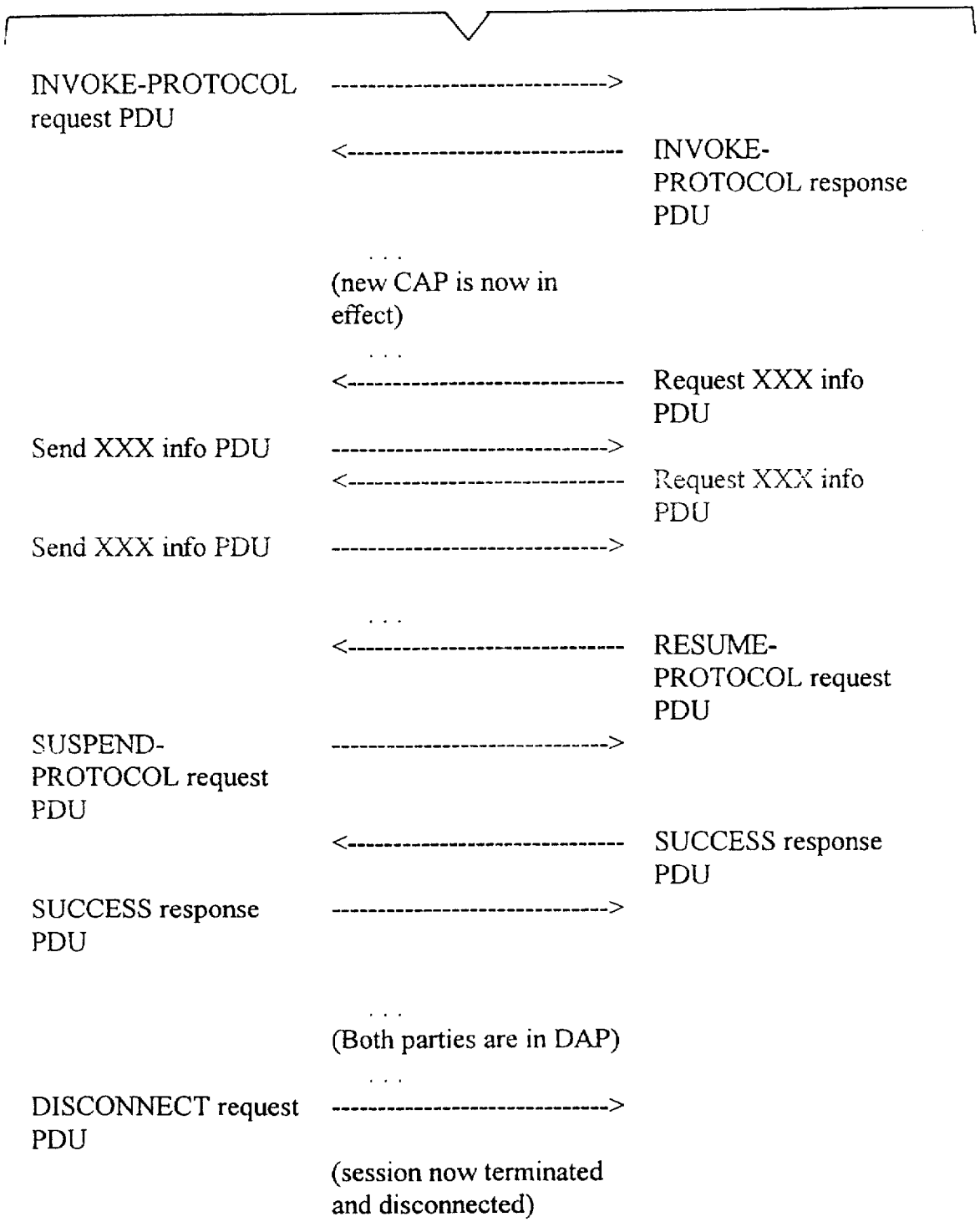
FIG. 3 is a timing diagram illustrating HMI startup, access to an application, change to another application, and return to the former application steps.

FIG. 3 is provided as a simplified example of the use of HMI to access a remote host, retrieve selected information from one service, retrieve information from another service, return to the first service and exit the services. It sequences through modem dialup, logging onto a host, starting HMI, going to a service, asking for information, going to a different service, asking for other information, returning, logging off, and finally disconnecting.

The type and form of the information passed in the START-ARTICLE READ request (within DAP, Display Application Protocol) and request XXX info sequences (within the new CAP) is CAP and application dependent. Each CAP uses the common PTIs (numbered 1 through 30) and its unique PTIs (numbered above 30). The format in which the information is sent between the host and the user is in CAP packets. The way the information is presented (displayed) on the user's micro is entirely up to the HMI application running on the user's micro.

The micro may ask for information from the host and receive it as a stream of packets faster than the micro is presenting them to the user. It is up to the application on the micro to determine when and how to display this data.

Articles, menus, and other data items are preferably labelled with page numbers. This enables efficient recall of previously received items as the micro remembers them. This technique is preferred unless the specific data has received a PAGE-INVALID request for a saved page.

The micro may send CONTINUE-ARTICLE-READ Request PDUs to cause it to receive information that it may not display immediately. Depending upon the user's desires, such pre-received pages may be discarded, viewed now, or viewed at a later time. This requesting ahead of displaying is an effective way for rapid display advancing without waiting for data. If the micro keeps track of such pages, it may recall them from its memory; otherwise it may have to request them from the host again.

For added versatility and efficiency, string data (contained in many PDUs) is usually compacted. This may be switched off and on. Also, extended 8-bit data compaction may be enabled and disabled. These are selected in "Initiate Application Protocol" escape sequences.

Figure 4:
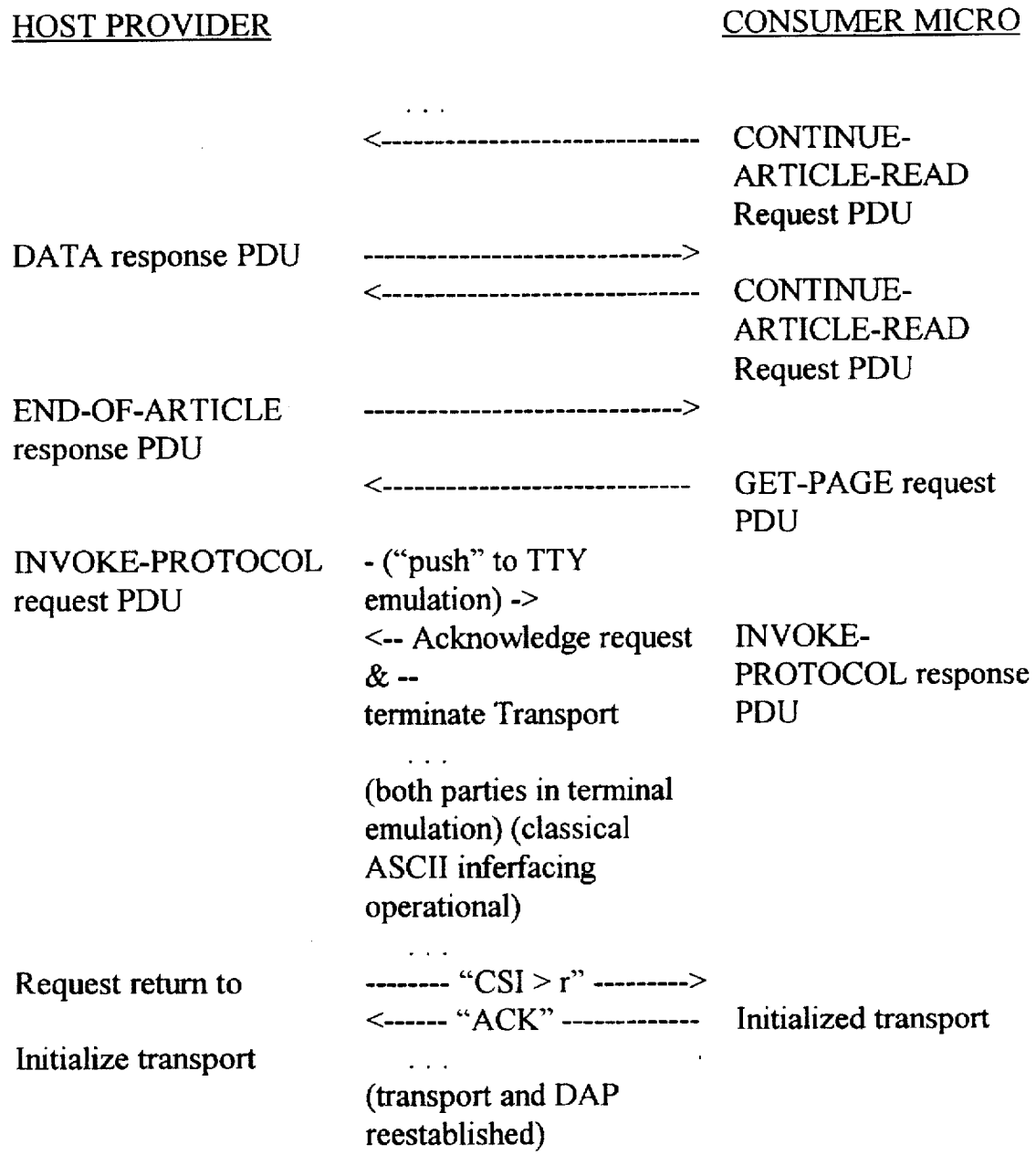
FIG. 4 is a timing diagram illustrating HMI article retrieval, change to TTY emulation, and resumption of previous protocol steps.

When the host application does not support HMI, but uses only ASCII terminal protocol, the sequence shown in FIG. 4 is used (starting from within DAP).

Micros may support several CAPs. If they do so, they may support requests and responses from multiple CAPs concurrently. Each CAP may have a different display application on the micro as needed. Table I contains a list of CAPs and their numbers.

Within each CAP, the Common PTIs (numbers 1 through 30) are shown in Table II. Within any given CAP, except where not appropriate, the common PTIs may be sent and received as requests and responses without disrupting normal operation of the application. For example, stock quotes and weather may be requested and received from within the ENS (Electronic New Service) CAP. Within the ENS, news item are collected from various source and saved in virtual clipping files.

The present invention may be implemented on an information service with the following components:

- a modem for communications over a telephone line between a microprocessor, serving an end-user, and a communications network node;
- a communications network providing error free exchange of characters between the node and a multitude of server host computers;
- an end-user microprocessor with a random access storage mechanism, an instruction sequencing controller with a stored instruction sequence, a user display mechanism capable of presenting selections and information to an end-user, and an input mechanism capable of receiving end-user selections and making them available to the instruction sequencing controller;
- a first server host capable of receiving and sending characters from and to the communications network. Said characters originating and terminating at the modem mentioned above;
- a validating program, that runs on the first server host and exchanges sequences of characters, using the communications network, with the end user's microprocessor and authenticates the validity of the end-user based upon a "login database;"
- a program on the first server host that, upon recognizing that the end-user micro has asked for HMI to be used, sends a sequence of characters to the micro requesting a corresponding reply list of characters indicating what CAPs the micro can process. When such a reply is received, the first server host may send a sequence of characters through the communications network to the micro requesting the micro to enter into DAP. If said program receives an acknowledgement that the micro has entered DAP, it will start Transport protocol;
- a stored program in the end-user processor with instructions to send valid login sequences through the network to the first server host such that a request to use HMI is known. Said stored program supports DAP and Transport protocol. Instructions to cause the micro to reply to character sequences that request lists of CAPs and/or to start instructions for DAP are also stored in the end-user micro program. An Information Manager Program (IMP) may be stored as the instruction sequence to effect necessary HMI protocol exchanges with the other components;
- program routines in the first server host to perform DAP sufficiently to facilitate requests from the micro to perform all "Common CAP" functions. If a GET-PAGE request is received from the micro and the specified page is not on the first server host, the first server host must have routines to: send SUSPEND-PROTOCOL request and cause a network transfer to a second server host also attached to the communications network;
- IMP may have routines to suspend and resume protocol in response to PDUs with the appropriate PTIs to request such. For every CAP it might request, IMP has appropriate instructions to properly process request and response PDUs from the server hosts;
- IMP may have routines to prepare for presentation and to display data received as a result of end-user selection; and
- a second server host is prepared to accept transfer requests from micros, enter requested CAPs specified in GET-PAGE requests, and resume transport and HMI protocols. As of this event, the second server host may facilitate all the functions of the first server host described above.

These components may operate in harmony with an end-user at the micro and information-administrators at the server hosts. When IMP first determines that it needs to access a server host to preferably perform a user selected request, it preferably performs the following steps:

- uses the modem to dial one of the local node ports on a network, then communicates with the answering node to establish a network connection to a first server host;
- sends and receives sequences of characters with the first server host to establish the user's identity, authenticate the user, request that HMI protocol be used and start the Information Service "top" page program;
- when IMP receives an interrogation sequence of characters from the "top" page program, running in the server host, sent through the communications network and the modem, it responds with sequences of characters indicating which CAPs it supports. When it receives the sequence of characters instructing it to start DAP and Transport protocol, IMP acknowledges that it will and does so; and
- IMP next sends a GET-PAGE request for the page it has determined has the service needed by the user.

If IMP receives, from the "top" page program on the first server host, a SUSPEND-PROTOCOL request: it ceases DAP and Transport protocols. When it receives the interrogation sequence of characters, it responds with sequences of characters indicating which CAPs it supports. When it receives the sequence of characters instructing it to resume Transport protocol, IMP acknowledges it will and does so.

Once the appropriate server host and protocol is running on the host and micro, the following takes place:

An INVOKE-PROTOCOL request is received by IMP. IMP responds with an INVOKE-PROTOCOL response (provided it supports the specified CAP);

IMP sends a START-READ request to the server host. If it receives a DATA response PDU, it collects the data and preferably decompresses it for presentation to the user as appropriate. IMP may format and display parts of the collected data while it is receiving more from the server host. IMP sends CONTINUE-READ requests and processes DATA responses similarly until it is stopped by one of the following:

- it receives an END-DATA response from the server host. At this point it formats whatever data it has collected and displays it;
- IMP decides to cease asking for data until it has displayed sufficient amounts of the information to decide to ask for more; or
- the user indicates that he does not want to view any more of the data.

If the user selects, from what IMP has displayed, an item that implies that a GET-PAGE request may be called for, it first checks its storage to see if it has collected the page earlier. If it has, it performs whatever actions it would upon receiving it. If it hasn't, it sends a GET-PAGE request to the server host and the above page access steps are performed.

When the user determines it is appropriate to disconnect from the Information Service, he may select the appropriate icon on the IMP screen. IMP sends a SHUTDOWN request to the current server host. IMP will receive a DISCONNECT request from the server host and perform appropriate actions to hang up the phone via the modem.

The preceding description alludes to START-READ and CONTINUE-READ requests and to DATA and END-DATA responses. The details of actual operation in specific CAPs vary. The following details apply to the ENS CAP. Refer to Table III for packet types unique to ENS. Refer to Table II for common PTIs.

When the page for ENS is entered via any required access steps, an INVOKE-PROTOCOL request and an INVOKE-PROTOCOL response, the end-user micro and server host are running their respective ENS application programs. It is up to the program on the micro to send the host a GET-CONFIG Request. The CONFIGURATION Response, that the host may reply with, contains the PDU in FIG. 5. The micro then sends an AGREEMENT request PDU to confirm agreement with the data it received in the CONFIGURATION Response PDU. The host will reply with a SUCCESS or FAILURE PDU.

At this point the micro sends a GET-FOLDER-OVERVIEW Request packet with the form shown in FIG. 6. It receives a FOLDER-OVERVIEW response PDU that contains the fields shown in FIG. 7.

If both user and public folders are determined to be available from the CONFIGURATION Response PDU, the micro may make an additional GET-FOLDER-OVERVIEW Request to receive a FOLDER-OVERVIEW response supplying the other set of folder records. At this point IMP displays the names of the folders it was informed of. It also shows the number of stories in each. It will react to user selections that select one of the displayed folders, and send a START-FOLDER-SEARCH Request for the selected one. This PDU is shown in FIG. 8. For ENS user folders, Search Type 0 (All) is chosen. The reply that comes back from the host may be a FOLDER-SEARCH Response PDU shown in FIG. 9.

IMP displays the titles of the received FOLDER-SEARCH response. IMP offers the user options to select a story or to search further. When the user chooses the latter, IMP sends CONTINUE-FOLDER-SEARCH Requests of the form in FIG. 10.

If the host has additional stories it will reply with FOLDER-SEARCH Responses as it did with the first FOLDER-SEARCH Request. If the host has exhausted the search, it will reply with a FOLDER-SEARCH Response with a zero count.

When the user selects a displayed title to be read, IMP sends a START-STORY-READ Request with the information illustrated in FIG. 11. If the story number is appropriate, IMP will receive DATA Response packets from the host as shown in FIG. 12. IMP displays the story as full screens of it become available. If the user and IMP elect to do so, IMP will send CONTINUE-STORY-READ requests shown in FIG. 13. IMP will receive DATA response PDUs in response to CONTINUE-STORY-READ requests until a DATA response with zero length is returned.

IMP provides a way for stories in user folders to be deleted. This option is offered to the user both when the story title is displayed and when the story has been received. If the user selects deletion of a story, IMP sends a DELETE-STORY Request to the host. The form of this PDU is shown in FIG. 14. IMP preferably deletes one story at a time. Thus, the count is always one. IMP receives a SUCCESS Response when the story has been deleted.

The following details apply to the EMP CAP. Refer to Table IV for PTIs unique to EMP. Refer to Table II for common packet types.

When the page for EMP is entered via the required access steps, an INVOKE-PROTOCOL request and an INVOKE-PROTOCOL response, the end-user micro and server host are running their respective EMP application programs. It is up to the program on the micro to send the host a READ-CONFIG Request as in FIG. 15. The CONFIG Response, that the host replies with, contains the PDU in FIG. 16.

At this point the micro sends a SEARCH-MSG Request packet with the form shown in FIG. 17. To get all messages: num_terms will be patter one, type will be set to Unread and pattern gets set to null. It receives a MSG-SUMMARY response PDU that contains the fields shown in FIG. 18. IMP displays the subjects and originator_names from the MSG-SUMMARY response and waits for the user to select one to be read.

When the user indicates which message to read by pointing to its subject and choosing "read" from the displayed menu, IMP sends a READ-MSG-HEADER request containing the desired message number (see FIG. 19) and receives a MSG-HEADER response from the host with appropriate details (see FIG. 20). IMP next sends a READ-MSG-CONTENTS request (see FIG. 21) and receives a DATA response (see FIG. 23). IMP continues to send READ-MSG-CONTENTS requests and receive DATA responses from the host until a DATA response with a zero length data segment is received.

An improved transfer method may be achieved by asking for the message to be sent to the micro using "push" style transfers. This is done by requesting the contents with a RECEIVE-MSG-CONTENTS request as shown in FIG. 22. When push style transfers are used, the host sends DATA response PDUs to the micro as fast as the underlying protocols and IMP can convey them. As with READ-MSG-CONTENTS requests, the last DATA response PDU will contain a zero length data segment.

The MSG-HEADER response may indicate a type_of_contents as Text; in this case IMP will display the DATA responses in a reformatted text window on the micro's screen. However, the MSG-HEADER response may indicate a type_of_contents as JPEG data; in this case IMP will give the user the choice of viewing or downloading the data. When viewing is selected, IMP converts and displays the DATA responses in a graphics window. When downloading is selected, the DATA responses are collected in a file of the user's choosing.

The following details apply to the FAP (Forum Application Protocol) CAP. Within the FAP, transactions are performed between an end-user application and remote bulletin board subscribers. Refer to Table V for PTIs unique to FAP. Refer to Table II for common packet types.

When the page for FAP is entered via the required access steps, an INVOKE-PROTOCOL request and an INVOKE-PROTOCOL response, the end-user micro and server host are running their respective FAP application programs. It is up to the program on the micro to send the host a READ-CONFIG Request. The CONFIG Response, that the host replies with, contains the PDU in FIG. 24. IMP uses last_access and last_msg_read as well as the msg_sections data in future Requests.

IMP now sends a GET-MSG-COUNTS Request PDU (FIG. 25) to the host with the msg_sections and last_msg_read obtained from the CONFIG-RESPONSE. The MSG-COUNTS Response PDU (FIG. 26) returned by the host tells IMP how many new_threads and new_msgs are in each section.

At this point the micro sends READ-MSG-SECTIONS Request to the host. The host replies with a MSG- SECTIONS response PDU of the form shown in FIG. 27. The micro uses the information returned in the MSG-SECTIONS Response PDU along with the counts obtained earlier to display a menu of section_ids for the user to select among.

The user may select a section to read and the micro will send a START-MSG-SEARCH Request PDU shown in FIG. 28 specifying the selected section and the start_msg remembered from the MSG-COUNTS Response PDU. Also, the number of new messages and subject text are requested.

The host replies with a MSG-SUMMARY Response PDU containing summary records for all messages found. FIG. 29 illustrates the format of this PDU. IMP displays subject_text and new_msgs obtained from this MSG-SUMMARY and gives the user the choice of reading or getting a map for each message.

When the user picks a thread to read, IMP sends a READ-MSG-HEADER Request with the appropriate message number (see FIG. 30). The host will reply by sending a MSG-HEADER Response PDU as shown in FIG. 31. IMP then sends the host a START-BODY-READ Request PDU (FIG. 32) to which the host replies with a DATA Response PDU (FIG. 34). If the user wants to view more of the message, the micro sends CONTINUE-MSG-BODY-READ Requests (FIG. 33) and receives DATA Responses until the entire message has been transferred to the micro.

When the user tells IMP to get a message map, the micro sends a READ-MAP Request PDU (FIG. 35) with the msg_no of the selected message and specifying that originator_names, recipient_names, parents and next_siblings are desired. A "map" is a visual representation of the relationships of one message to other messages. Relationships indicating "originating" message, "child" messages, "parent" messages, "sibling" messages as well as "recipients" can be shown much like a "family tree".

The host responds by sending as many MAP Responses (FIG. 36) as required to completely detail the information asked for in the MAP Request. The micro uses the total_count field to recognize when the end is reached. IMP displays this as a tree allowing the user to select messages based on location in the map. If the user selects a place in the map, the micro sends READ-MSG-HEADER, a START-BODY-READ and CONTINUE-MSG-BODY-READs to obtain the message as described earlier.

The foregoing description of the invention is illustrative and explanatory thereof, and various changes in the details of the above described preferred embodiment may be made by those skilled in the art without departing from the spirit of the invention.

What is claimed is:

1. An information retrieval system comprising:

means for a host computer and an end-user microcomputer to communicate via a plurality of application protocols end-user requests for information or other services and host computer responses to said requests;

means at said end-user microcomputer for said end-user microcomputer to display information contained in said host computer responses;

means for said host to query said end-user microcomputer for which of said plurality of application protocols it utilizes; and means for said end-user microcomputer to respond with acknowledgments for application protocols it supports and negative acknowledgments for applications it does not support.

2. The system of claim 1 further comprising:

means for said end-user microcomputer to select an application on a host computer; and means for said host computer to acknowledge completion of said selection.

3. The system of claim 2 further comprising:

means for said selected application to specify which of said application protocols it utilizes.

4. The system of claim 2 further comprising:

a common application protocol comprising requests and responses that support each of said application protocols.

5. The system of claim 4 further comprising:

means for creating data subunits distinguished by packet-type identifiers for identifying an application that supports said data subunits.

6. A method for retrieving information from a host computer:

defining a plurality of application protocols for exchanging end-user requests for information and host computer responses to said requests;

transmitting from an end-user microcomputer to said host computer a first service request;

transmitting from said host computer to said end-user microcomputer a request to invoke one of said plurality of application protocols;

transmitting from said end-user microcomputer to said host computer an acknowledgment to said request to invoke one of said plurality of application protocols;

transmitting from said end-user microcomputer to said host computer a first information request in accordance with said invoked application protocol;

transmitting from said host computer to said end-user microcomputer a response containing said requested information in accordance with said invoked application protocol;

preparing data contained in said response at said end-user microcomputer for display on said end-user microcomputer; and displaying said prepared data on said end-user microcomputer.

7. The method of claim 6 further comprising the step of:

defining a common application protocol comprising requests and responses that support each of said plurality of application protocols.

8. The method of claim 6 further comprising the steps of:

transmitting from said end-user microcomputer to said host computer a second service request;

transmitting from said host computer to said end-user microcomputer a request to invoke a new one of said plurality of application protocols not currently invoked;

transmitting from said end-user microcomputer to said host computer an acknowledgment to said request to invoke a new one of said plurality of application protocols;

transmitting from said end-user microcomputer to said host computer a second information request in accordance with said invoked application protocol;

transmitting from said host computer to said end-user microcomputer a response containing said requested information in accordance with said invoked application protocol;

preparing data contained in said response at said end-user microcomputer for display on said end-user microcomputer; and displaying said prepared data on said end-user microcomputer.

* * * * *

UNITED STATES PATENT AND TRADEMARK OFFICE
CERTIFICATE OF CORRECTION

PATENT NO. : 5,737,538
DATED : April 7, 1998
INVENTOR(S) : Stephen E. Wilhite

It is certified that error appears in the above-indentified patent and that said Letters Patent is hereby corrected as shown below:

In column 1, line 11, please delete the word "the" and replace it with -- The --.

In column 5, line 5, please delete the word "item" and replace it with -- items -- and please delete the word "source" and replace it with -- sources --.

Signed and Sealed this

Fourth Day of August, 1998

*Attest:*

BRUCE LEHMAN

*Attesting Officer*   *Commissioner of Patents and Trademarks*